US011942227B2

(12) United States Patent
Yi et al.

(10) Patent No.: US 11,942,227 B2
(45) Date of Patent: Mar. 26, 2024

(54) PASSIVE COOLING STRUCTURE FOR NUCLEAR REACTOR

(71) Applicant: KOREA ATOMIC ENERGY RESEARCH INSTITUTE, Daejeon (KR)

(72) Inventors: Sung-jae Yi, Daejeon (KR); Hyun Sik Park, Daejeon (KR)

(73) Assignee: KOREA ATOMIC ENERGY RESEARCH INSTITUTE, Daejeon (KR)

(*) Notice: Subject to any disclaimer, the term of this patent is extended or adjusted under 35 U.S.C. 154(b) by 0 days.

(21) Appl. No.: 17/008,809

(22) Filed: Sep. 1, 2020

(65) Prior Publication Data

US 2021/0174977 A1 Jun. 10, 2021

(30) Foreign Application Priority Data

Dec. 9, 2019 (KR) ........................ 10-2019-0162602

(51) Int. Cl.
*G21C 15/26* (2006.01)
*G21C 15/12* (2006.01)
*G21C 15/18* (2006.01)

(52) U.S. Cl.
CPC ............. *G21C 15/26* (2013.01); *G21C 15/12* (2013.01); *G21C 15/18* (2013.01)

(58) Field of Classification Search
CPC ........ G21C 9/004; G21C 9/008; G21C 9/022; G21C 13/022; G21C 15/12; G21C 15/18; G21C 15/182; G21C 15/185; G21C 15/26
(Continued)

(56) References Cited

U.S. PATENT DOCUMENTS 5,215,708 A * 6/1993 Fennern ................... G21D 1/00
376/293
2014/0334591 A1* 11/2014 Kim ....................... G21C 15/18
376/282

(Continued)

FOREIGN PATENT DOCUMENTS

JP 2012-233711 A 11/2012
KR 10-1619075 5/2016
(Continued)

OTHER PUBLICATIONS

Yi, Sung-Jae, Chul-Hwa Song, and Hyun-Sik Park. "PX—an innovative safety concept for an unmanned reactor." Nuclear Engineering and Technology 48.1 (2016): 268-273. (Year: 2016).*

*Primary Examiner* — Jack W Keith
*Assistant Examiner* — Jinney Kil
(74) *Attorney, Agent, or Firm* — Harness, Dickey & Pierce, P.L.C.

(57) ABSTRACT

A passive cooling system for a nuclear reactor includes an energy release space in which a reactor vessel is accommodated, an energy absorbing space separated from the energy release space, and an energy transfer space above the energy absorbing space and configured to absorb and cool heat transferred from the reactor vessel and discharge the absorbed heat to an outside of the system through an outer wall thereof. The passive cooling system further includes a first cooling flow path configured to transfer the heat in the reactor vessel to the energy transfer space, a pressure balance pipe configured to transfer the pressure in the energy release space to the energy absorbing space therethrough, and a coolant spray pipe configured to transfer the cooling water in the energy absorbing space pressurized by the pressure balance pipe to the energy transfer space may be provided.

15 Claims, 9 Drawing Sheets

(58) Field of Classification Search
USPC ........ 376/282, 283, 298, 299, 378, 402, 403
See application file for complete search history.

(56) References Cited

U.S. PATENT DOCUMENTS

| | | | |
|---|---|---|---|
| 2015/0131769 A1* | 5/2015 | Larrion | A62B 1/02 |
| | | | 376/282 |
| 2016/0042816 A1* | 2/2016 | Yi | G21C 15/18 |
| | | | 376/283 |
| 2018/0061514 A1* | 3/2018 | Yi | G21C 15/18 |

FOREIGN PATENT DOCUMENTS

| KR | 10-2017-0000601 A | | 1/2017 |
|---|---|---|---|
| KR | 20170000601 A | * | 1/2017 |
| KR | 10-1731817 | | 5/2017 |
| KR | 20180070335 A | * | 6/2018 |
| KR | 10-2019-0073861 A | | 6/2019 |

* cited by examiner

PASSIVE COOLING STRUCTURE FOR NUCLEAR REACTOR

CROSS-REFERENCE TO RELATED APPLICATION

This application claims priority to and the benefit of South Korean Patent Application No. 10-2019-0162602, filed on Dec. 9, 2019, the disclosure of which is incorporated by reference herein.

TECHNICAL FIELD

The present invention relates to a passive infinite cooling system for a nuclear reactor and a method of operating the same, and more particularly, to a passive infinite cooling system for a nuclear reactor, in which infinite cooling circulation is performed by itself while cooling water is passively circulated without separate operation or control of an operator and supply of external power when an abnormality occurs in the nuclear reactor, and a method of operating the same.

BACKGROUND

Nuclear power generation is a method of generating electric energy by driving a turbine using energy generated in nuclear fission, which does not generate carbon dioxide in the power generation process and can produce a great deal of electricity with less fuel and thus has been adopted and operated as one power generation method in many countries. In such nuclear power generation, cooling should be essentially performed because a large amount of heat is generated. In general nuclear power generation, as illustrated in FIG. 1, a great deal of heat energy generated by nuclear fission of a reactor core 20 in a reactor vessel 10 is transferred to a coolant in the reactor vessel 10, and the coolant is circulated again to the reactor vessel 10 after exchanging heat in a heat exchanger 30. In addition, water in a drive system 50 is circulated using a path independent from the coolant, the heat exchanger 30 generates steam in the drive system 50 using the heat absorbed from the coolant, a turbine 52 is driven through the generated steam, and the heat energy in the steam is turned into electric energy by a generator 54 and then the steam is condensed into water again to be circulated to the heat exchanger 30.

In such a nuclear reactor, a great deal of heat energy is generated. Ordinarily, the heat in the nuclear reactor is appropriately cooled, whereas when the heat in the nuclear reactor is not appropriately cooled due to an unexpected accident or the like, a large accident may occur in which the nuclear reactor facility itself is destroyed, which can lead to a very dangerous situation that may cause radioactive contamination of surrounding environments in addition to a loss of facilities. Therefore, various safety systems are essentially provided to cool the nuclear reactor in an emergency. The safety systems are provided in the form of supplementarily supplying a coolant to each of portions of the nuclear reactor, and in the form of appropriately circulating the coolant to discharge the returned heat to the outside through a heat sink.

The heat sink is formed in the form of a heat exchanger for discharging only heat without leaking the coolant therein, and such a heat exchanger may be immersed in water such as sea water or river water to discharge the heat by heat exchange. As described above, the method in which the heat exchanger is immersed in the coolant (water) is referred to as pool boiling. In heat exchange of the pool-boiling method, there is a problem in that a heat transfer rate is not satisfactory, and thus a heat discharge rate may be slower than a rate at which the nuclear reactor generates heat, and accordingly, an entire system should be enlarged.

In addition, the conventional nuclear reactors are provided to be operated by the operator's operation according to a manual when an emergency occurs. There is a problem in that, when a large accident occurs, the operator may also be injured, killed, or evacuated, resulting in the absence of the operator, and since the manual is too complicated to understand, a situation may occur in which an accident cannot be blocked due to the operator's mistake when an emergency occurs.

SUMMARY

The present invention is directed to providing a passive infinite cooling system for a nuclear reactor, in which an infinite cooling circulation is performed by itself while cooling water is passively circulated by heat and pressure generated when an abnormality occurs in the nuclear reactor, no separate operation of an operator is required, supply of external power is minimized, and a heat discharge rate is increased so that a size of an entire cooling system is reduced and safety is improved, and a method of operating the same. The scope of the present invention is not limited to the above-described object and other unmentioned objects may be clearly understood by those skilled in the art from the following descriptions.

According to an aspect of the present invention, there is provided a passive infinite cooling system for a nuclear reactor. The system includes an energy release space in which a reactor vessel, in which a reactor core is accommodated, is accommodated, an energy absorbing space in which cooling water is accommodated while being separated from the energy release space and to which a pressure in the energy release space is transferred, an energy transfer space, which is provided above the energy absorbing space, absorbs and cools heat transferred from the reactor vessel, and discharges the absorbed heat to the outside through an outer wall thereof, a cooling space configured to separate the energy absorbing space and the energy transfer space from the energy release space, a first cooling flow path through which the heat in the reactor vessel is transferred to the energy transfer space, a pressure balance pipe through which the pressure in the energy release space is transferred to the energy absorbing space, and a coolant spray pipe through which the cooling water in the energy absorbing space pressurized by the pressure balance pipe is transferred to the energy transfer space. The energy transfer space includes a saturated vapor pressure cooling chamber, which is formed to be connected to an inner side of an upper outer wall of the cooling space, and in which cooling water is accommodated, a heat exchanger of the first cooling flow path is located, and a spray-side end of the coolant spray pipe is located, and a reference atmospheric pressure chamber, which is provided below the saturated vapor pressure cooling chamber and communicates with the saturated vapor pressure cooling chamber, is filled with air so as to achieve a pressure balance with the cooling water in the saturated vapor pressure cooling chamber, and in which a water level thereof varies according to a pressure in the saturated vapor pressure cooling chamber.

The first cooling flow path may include a first heat exchanger configured to absorb the heat in the reactor vessel, and a second heat exchanger, which is provided in the saturated vapor pressure cooling chamber and discharges the heat absorbed by the first heat exchanger. An upper end of the coolant spray pipe may be provided to spray the cooling water in the energy absorbing space onto the second heat exchanger. The first cooling flow path may further include a steam discharge valve configured to selectively discharge water vapor in the first cooling flow path into the energy release space in order to increase the pressure in the energy release space.

The energy transfer space may include a reference atmospheric pressure separation wall which separates the saturated vapor pressure cooling chamber from the reference atmospheric pressure chamber and is provided to communicate the saturated vapor pressure cooling chamber with the reference atmospheric pressure chamber below the saturated vapor pressure cooling chamber and the reference atmospheric pressure chamber. The system may further include a second cooling flow path which is provided adjacent to the second heat exchanger in the energy transfer space and discharges the heat in the energy transfer space to an outside of the cooling space. The cooling water, which is sprayed from the coolant spray pipe toward the second heat exchanger, may be vaporized while absorbing the heat of the second heat exchanger, and the heat may be transferred by a two-phase heat transfer mechanism in which the vaporized water vapor is cooled and condensed in the second cooling flow path.

The second cooling flow path may include a third heat exchanger, which is provided in the saturated vapor pressure cooling chamber and absorbs the heat in the saturated vapor pressure cooling chamber heated by the first cooling flow path. The second cooling flow path may further include a fourth heat exchanger, which is provided in the energy absorbing space and absorbs the heat in the energy absorbing space. In the second cooling flow path, the fourth heat exchanger may be formed at a higher level than the third heat exchanger, and the fourth heat exchanger may be provided at a lower level than the third heat exchanger.

The system may further include a coolant injection pipe configured to introduce the cooling water in the reference atmospheric pressure chamber into the energy release space, and an injection pipe opening or closing valve configured to open the coolant injection pipe. The cooling space may be located adjacent to sea water or river water.

The system may further include an outer wall cooling module configured to cause water or air on the outer wall side of the cooling space to flow under a pressure of water vapor in the energy release space. The outer wall cooling module may include a pressure inlet pipe into which the water vapor in the energy release space is introduced, a turbine configured to generate power under the pressure of the water vapor discharged from the pressure inlet pipe, and a cooling fan, which is provided above the cooling space and rotated to cause the water or air on the outer wall side of the cooling space to flow upward by a rotational force of the turbine. The outer wall cooling module may further include a pressure release valve configured to selectively open the pressure inlet pipe.

The system may further include a cooling fin provided on the outer wall side of the cooling space. The cooling fin may be formed parallel to a flow direction of water generated by the cooling fin on the outer wall side of the cooling space corresponding to the energy release space.

The system may further include a cooling water supply pipe configured to guide the cooling water in the energy absorbing space to a lower side of the reactor vessel of the energy release space, and a low-temperature molten alloy body, which is provided on an end side of the cooling water supply pipe to shield the cooling water supply pipe and which is melted by the heat transferred from the reactor vessel to open the cooling water supply pipe when a temperature in the reactor vessel increases excessively. A high-temperature fluid backflow-prevention pipe may be formed in an inverted U shape curved upward from the end of the cooling water supply pipe in which the low-temperature molten alloy body is provided. The system may further include a weighted body provided on an outer end portion of the low-temperature molten alloy body.

According to another aspect of the present invention, there is provided a method of operating a passive infinite cooling system for a nuclear reactor. The method includes a pressure increasing operation in which a temperature in an energy release space increases so that a pressure in the energy release space increases, a cavitation operation in which heat in a reactor vessel is transferred to a saturated vapor pressure cooling chamber through a second heat exchanger of a first cooling flow path, cooling water in the saturated vapor pressure cooling chamber heated by the second heat exchanger is vaporized so that a cavity is generated, and the second heat exchanger of the first cooling flow path and a third heat exchanger of a second cooling flow path are exposed above a water surface, a pressure transfer operation in which a pressure in the energy release space is transferred to an energy absorbing space through a pressure balance pipe, a cooling water spraying operation in which a pressure in the energy absorbing space increases so that the cooling water in the energy absorbing space is raised through a coolant spray pipe and sprayed onto the second heat exchanger of the first cooling flow path, and a two-phase heat transfer cooling operation in which heat exchange is performed a two-phase heat transfer mechanism in which the cooling water sprayed from the coolant spray pipe is vaporized in the second heat exchanger and is condensed in the third heat exchanger.

The method may further include a cooling water injection operation in which, when a temperature in the energy absorbing space increases to a preset temperature or higher, an injection pipe opening or closing valve is opened and cooling water in a reference atmospheric pressure chamber is injected into the energy release space. The method may further include a cooling fan rotation operation in which, when the pressure in the energy absorbing space increases to a preset pressure or higher, a pressure inlet pipe is opened, a turbine is rotated under the pressure in the energy release space, and a cooling fan is rotated by a rotational force of the turbine. The method may further include a melt preventing operation in which, when a temperature of the reactor vessel increases to a preset temperature or higher, a cooling water supply pipe is opened by melting a low-temperature molten alloy body so that cooling water in the energy absorbing space is introduced into a lower side of the reactor vessel to cool the reactor vessel.

BRIEF DESCRIPTION OF THE DRAWINGS

Detailed descriptions of exemplary embodiments of the present invention described below and the summary described above will be better understood when read in conjunction with the accompanying drawings. For the purpose of illustrating the present invention, the drawings illustrate the exemplary embodiments. However, it should be understood that the present invention is not limited to the precise arrangements and units illustrated. The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention, in which the objects of the present invention can be specifically realized, will be described with reference to the accompanying drawings. In descriptions of the exemplary embodiments, the same name and the same code are used for the same configuration, and additional description will be omitted.

Figure 1:
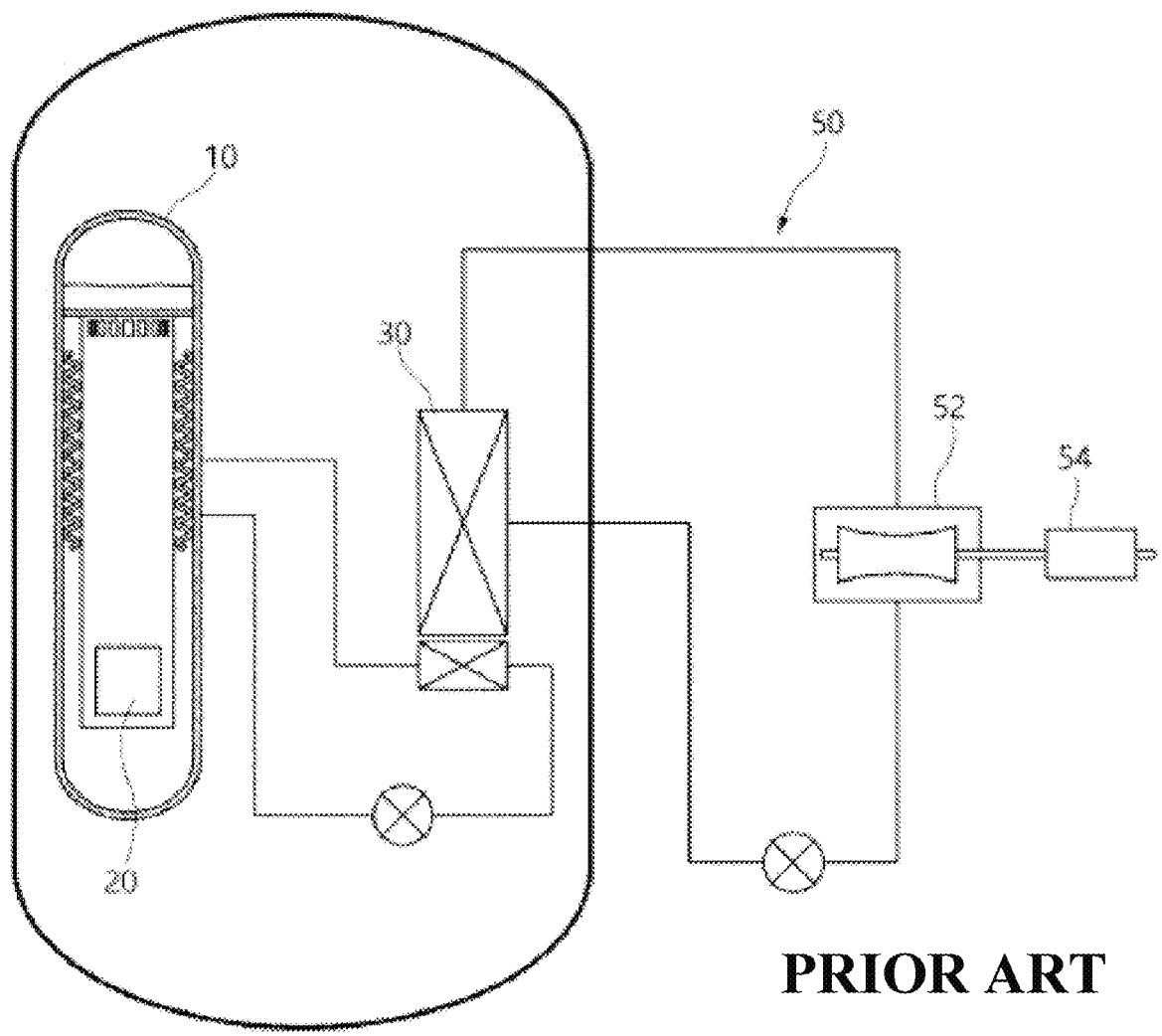
FIG. 1 is a schematic view illustrating a conventional nuclear reactor.
Figure 2:
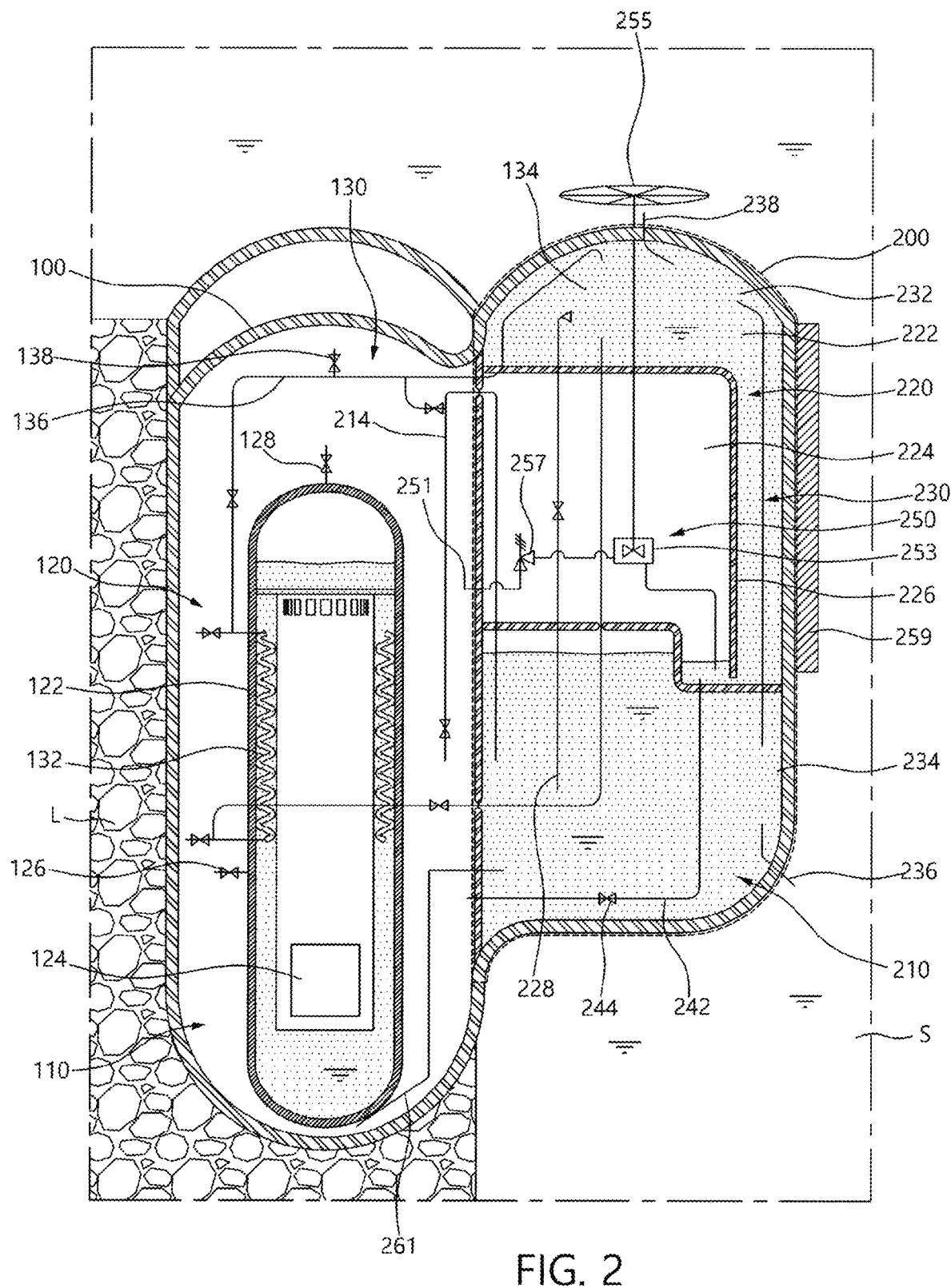
FIG. 2 is a view illustrating a state before operation of or an initial state of operation of a passive infinite cooling system for a nuclear reactor according to an embodiment of the present invention.

Hereinafter, a passive infinite cooling system for a nuclear reactor according to an embodiment of the present invention will be described. The passive infinite cooling system for a nuclear reactor according to the present embodiment may include an energy release space (ERS) 110, an energy absorbing space (EAS) 210, and an energy transfer space (ETS) 220, as illustrated in FIG. 2. The ERS 110 accommodates a nuclear reactor drive system 120. The nuclear reactor drive system 120 may include a reactor vessel 122 which accommodates a reactor core 124, a steam generator, which generates steam using heat generated in the reactor core 124 and is provided inside the reactor vessel 122 to circulate the generated steam to an external turbine 253, a flow path, and the like.

The EAS 210 may accommodate a coolant and be separated from the ERS 110. The EAS 210 may be provided to communicate with the ERS 110 on an upper side thereof and to transfer a pressure in the ERS 110 to the EAS 210. In this case, as the coolant, various types of substances may be used, and a representative example of the coolant may be water.

The ETS 220 is isolated from the ERS 110 and the EAS 210, and particularly, is provided above the EAS 210. The ETS 220 is provided to absorb and cool heat generated in the reactor vessel 122 of the ERS 110 and to transfer the absorbed heat to the outside and dissipate the heat. The heat dissipation may be performed through an outer wall of a cooling space 200.

In this case, the ERS 110 may be provided in a first space 100, and the EAS 210 and the ETS 220 may be provided in the cooling space 200. The first space 100 and the cooling space 200 may be separated from each other, and outer walls thereof may be formed of concrete or metal so as to have explosion resistance.

Further, the first space 100 including the ERS 110 may be installed on land L, such as underground or ground, and the cooling space 200 may be installed in water such as a sea S or river, or installed adjacent to water. Of course, the present invention is not limited thereto, and the first space 100 and the cooling space 200 may be installed in various places, such as on a transportation means such as a ship or the like. In this case, the ETS 220 may be installed to be in contact with an outer wall of the cooling space 200 and may be provided to transfer the heat absorbed through heat transfer to water present outside the cooling space 200 and dissipate the heat.

Meanwhile, a first cooling flow path 130 may be provided. The first cooling flow path 130 is a component that transfers the heat in the reactor vessel 122 to the ETS 220 and may include a first heat exchanger 132 which absorbs the heat from the reactor vessel 122, a second heat exchanger 134 which dissipates the absorbed heat, and a pipe 136 which guides a heat absorption medium flowing through the first heat exchanger 132 and the second heat exchanger 134 into the first heat exchanger 132 and the reactor vessel 122 so as to be circulated. In this case, the first heat exchanger 132 may be located in the reactor vessel 122. In this case, as the heat absorption medium, materials of various components may be used, and a representative example of the heat absorption medium may be water.

In this case, the first heat exchanger 132 of the first cooling flow path 130 may be the steam generator of the nuclear reactor drive system 120 described above or may be a separate component from the steam generator. That is, when the first heat exchanger 132 is the steam generator of the nuclear reactor drive system 120, the pipe 136 of the first cooling flow path 130 may be provided to branch or join at any point of a pipe of the flow path of the nuclear reactor drive system 120.

Further, the ERS 110 and the EAS 210 may communicate with each other such that pressure is transferred. To this end, a pressure balance pipe 214 that transfers the pressure in the ERS 110 to the EAS 210 may be formed to cross the first space 100 and the cooling space 200. In this case, an end of the cooling space 200 side of the pressure balance pipe 214 may be located in the EAS 210. Further, the pressure balance pipe 214 may be formed by bending in an inverted U shape such that the cooling water in the EAS 210 does not flow back through the pressure balance pipe 214 to the first space 100, and an upper end of the bent portion may be located at a higher level than an upper side end of the EAS 210.

Therefore, when the pressure in the ERS 110 increases by the pressure balance pipe 214, the increased pressure may be transferred to the EAS 210. That is, when the reactor vessel 122 is overheated so that a temperature in the ERS 110 increases, the pressure in the ERS 110 may also increase due to the increased temperature, and the increased pressure may be transferred to the EAS 210 through the pressure balance pipe 214 so that the cooling water accommodated in the EAS 210 may be pressurized. In addition, a coolant spray pipe 228 may be provided. The coolant spray pipe 228 may be provided to guide the cooling water in the EAS 210 pressurized by the pressure balance pipe 214 to the ETS 220.

Meanwhile, the ETS 220 may include a saturated vapor pressure cooling chamber 222 and a reference atmospheric pressure chamber 224. The saturated vapor pressure cooling chamber 222 may be formed to be connected to an inside of the outer wall of the cooling space 200, and the cooling water may be accommodated therein. Further, the second heat exchanger 134 of the first cooling flow path 130 may be located inside the saturated vapor pressure cooling chamber 222, and a spray-side end of the coolant spray pipe 228 may be provided to spray the cooling water onto the second heat exchanger 134.

In addition, the reference atmospheric pressure chamber 224 may be provided below the saturated vapor pressure cooling chamber 222, may communicate with a lower side of the saturated vapor pressure cooling chamber 222 at a lower side thereof, and may be filled with air to achieve a pressure balance with the cooling water in the saturated vapor pressure cooling chamber 222. Airtightness may be achieved such that the air inside the reference atmospheric pressure chamber 224 does not leak to the outside. That is, the cooling water in the saturated vapor pressure cooling chamber 222 is supported by a pressure of the air inside the reference atmospheric pressure chamber 224. Therefore, when the pressure in the saturated vapor pressure cooling chamber 222 increases, the cooling water may be introduced into the reference atmospheric pressure chamber 224, and when the pressure in the saturated vapor pressure cooling chamber 222 is decreased, a water level of the cooling water in the reference atmospheric pressure chamber 224 may be changed according to the pressure in the saturated vapor pressure cooling chamber 222, for example, according to the cooling water in the reference atmospheric pressure chamber 224 being pushed out to the saturated vapor pressure cooling chamber 222 and the like.

In addition, the ETS 220 may include a reference atmospheric pressure separation wall 226. The reference atmospheric pressure separation wall 226 may separate the saturated vapor pressure cooling chamber 222 from the reference atmospheric pressure chamber 224 and may be provided such that the saturated vapor pressure cooling chamber 222 communicates with the reference atmospheric pressure chamber 224 at lower sides of the saturated vapor pressure cooling chamber 222 and the reference atmospheric pressure chamber 224. Meanwhile, when an inside of the saturated vapor pressure cooling chamber 222 is fully filled with the cooling water, the saturated vapor pressure cooling chamber 222 may be formed to have a height that is as high as possible when a cavity is not generated due to air pressure at an upper side end thereof. Therefore, when a temperature of the cooling water in the saturated vapor pressure cooling chamber 222 increases, the cooling water in the saturated vapor pressure cooling chamber 222 may be more easily vaporized at the upper side end of the saturated vapor pressure cooling chamber 222.

In addition, the second heat exchanger 134 of the first cooling flow path 130 may be provided adjacent to the upper side end of the saturated vapor pressure cooling chamber 222. Therefore, the cooling water in the saturated vapor pressure cooling chamber 222 heated by the second heat exchanger 134 of the first cooling flow path 130 may be easily vaporized at the upper side end of the saturated vapor pressure cooling chamber 222.

In addition, a second cooling flow path 230 may be provided. The second cooling flow path 230 may be provided in the ETS 220 and may discharge the heat in the ETS 220 to sea water, river water, or the atmosphere outside the cooling space 200. The second cooling flow path 230 may include a third heat exchanger 232 which re-absorbs the heat absorbed by the cooling water which is sprayed onto the second heat exchanger 134 from the coolant spray pipe 228. The second heat exchanger 134, the coolant spray pipe 228, and the third heat exchanger 232 may be provided in the saturated vapor pressure cooling chamber 222.

Figure 3:
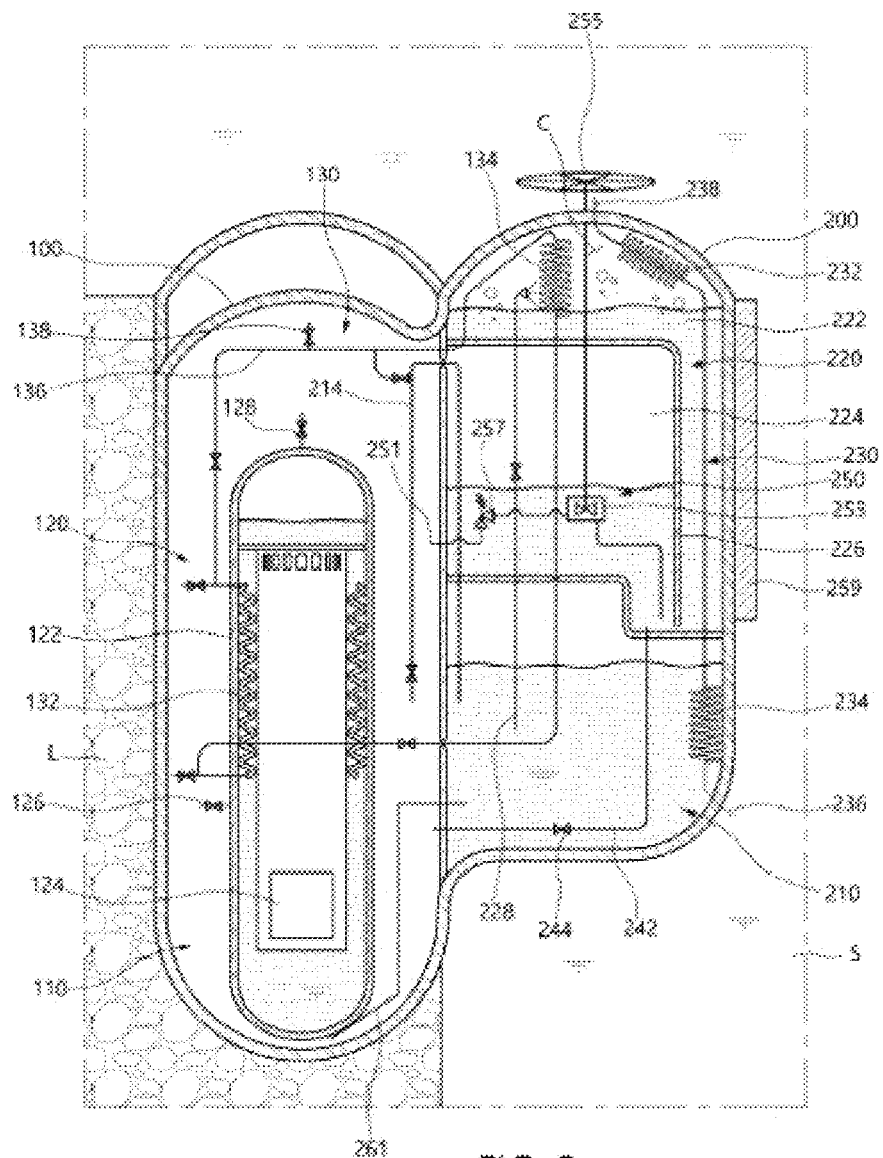
FIG. 3 is a view illustrating a state during operation of the passive infinite cooling system for a nuclear reactor of FIG. 2.

As described above, ordinarily, an inner side of the saturated vapor pressure cooling chamber 222 is fully filled with the cooling water, whereas as illustrated in FIG. 3, when the temperature of the cooling water increases, the cooling water may be vaporized from the upper side end of the saturated vapor pressure cooling chamber 222 so that a cavity may be formed, and accordingly, the second heat exchanger 134, the coolant spray pipe 228, and the third heat exchanger 232 may be exposed to the cavity. In this case, the cavity around the second heat exchanger, the coolant spray pipe 228, and the third heat exchanger 232 may be in a saturated vapor pressure state.

Figure 4:
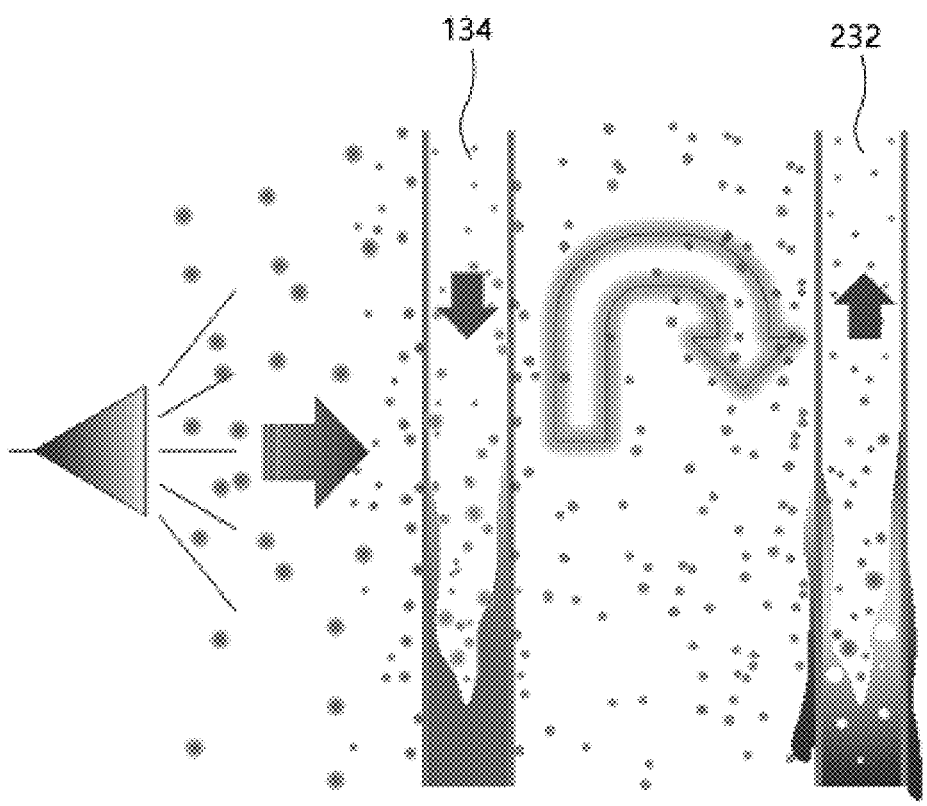
FIG. 4 is a view illustrating a state in which water sprayed from a coolant spray pipe is condensed in a third heat exchanger after being evaporated in a second heat exchanger by a two-phase heat transfer mechanism.

In this case, as illustrated in FIG. 4, when the cooling water is sprayed onto the second heat exchanger 134 from the coolant spray pipe 228 in a dripping state, the heat is absorbed by the second heat exchanger 134 so that the sprayed cooling water is vaporized into water vapor. The water vapor may be condensed into water again by the heat being taken by the third heat exchanger 232 adjacent thereto and cooled. Therefore, the heat is absorbed or dissipated through heat of vaporization in which water is vaporized and heat of condensation in which water vapor is condensed into water. The heat transfer phenomenon caused by the vaporization and condensation of the cooling water as described above is referred to as a two-phase heat transfer mechanism. The two-phase heat transfer mechanism is evaluated to have a high heat transfer rate of about 20 times or more than that of the above-described pool-boiling method.

Further, the second cooling flow path 230 may further include a fourth heat exchanger 234. The fourth heat exchanger 234 may be provided in the EAS 210 and may be provided to cool the cooling water in the EAS 210. Therefore, the second cooling flow path 230 may cool the ETS 220 and also cool the cooling water in the EAS 210.

In this case, the third heat exchanger 232 may be provided above the second cooling flow path 230, and the fourth heat exchanger 234 may be provided at a relatively lower level than the third heat exchanger 232. Since the heat absorbed by the third heat exchanger 232 is more than the heat absorbed by the fourth heat exchanger 234, the water may naturally flow from the fourth heat exchanger 234 to the third heat exchanger 232 located above the second cooling flow path 230. Accordingly, the water may be introduced from a lower side of the fourth heat exchanger 234, and the water heated by absorbing the heat may be discharged to an upper side of the third heat exchanger 232.

Both ends of the second cooling flow path 230, that is, an inlet 236 into which water is introduced and an outlet 238 from which water is introduced, may communicate with water outside the cooling space 200. Therefore, the water in the second cooling flow path 230 may be circulated by natural convection without necessarily having a separate pump or the like. In this case, the inlet 236 is provided below the fourth heat exchanger 234, and the outlet 238 may be provided above the third heat exchanger 232.

In addition, a coolant injection pipe 242 and an injection pipe opening or closing valve 244 may be provided. The coolant injection pipe 242 may be a pipe which is formed to cross the first space 100 and the cooling space 200 such that the cooling water in the reference atmospheric pressure chamber 224 is introduced into the ERS 110. In addition, the injection pipe opening or closing valve 244 may be provided to selectively open or close the coolant injection pipe 242.

Figure 5:
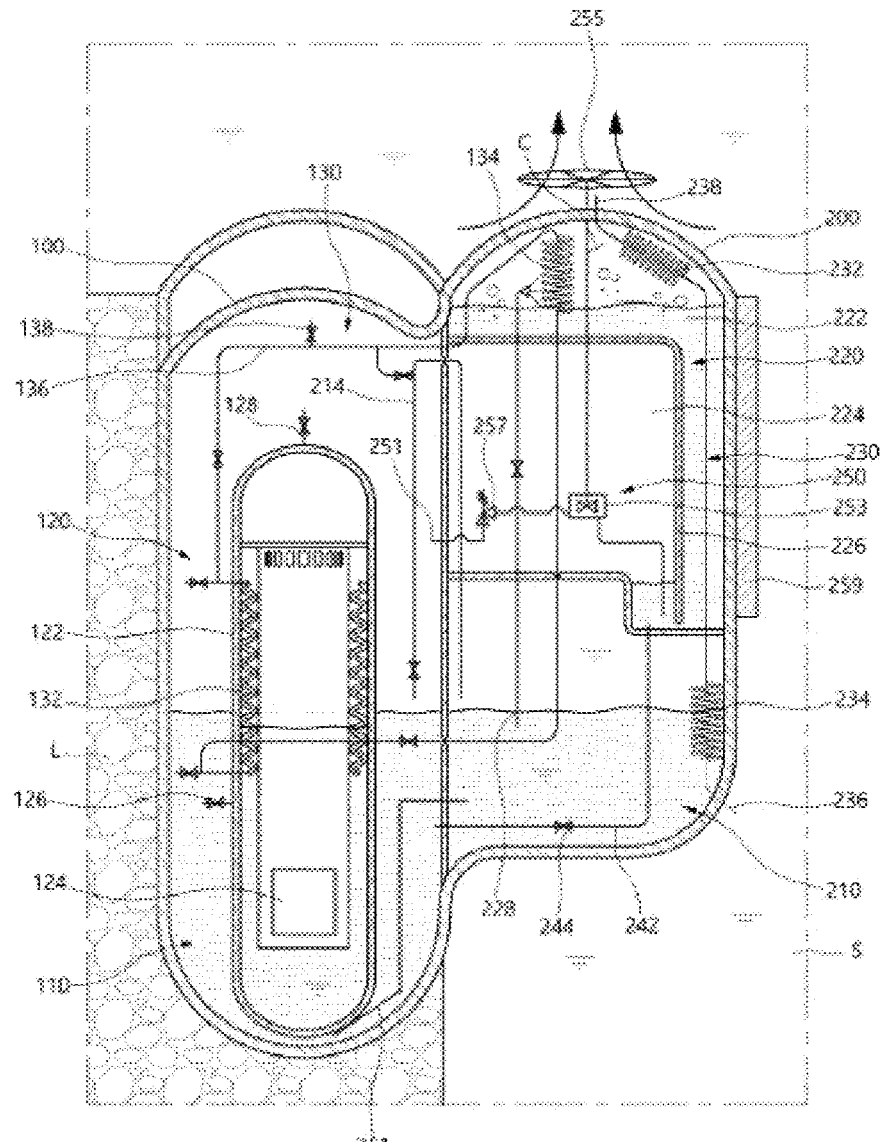
FIG. 5 is a view illustrating a state when the passive infinite cooling system for a nuclear reactor of FIG. 3 is further heated.

Ordinarily, the injection pipe opening or closing valve 244 is closed, and when the temperature or the pressure in the reactor vessel 122 or the ERS 110 increases excessively, when the water level of the cooling water in the reference atmospheric pressure chamber 224 is excessively increased, or when no cavity is formed in the saturated vapor pressure cooling chamber 222, the injection pipe opening or closing valve 244 may be opened. When the injection pipe opening or closing valve 244 is opened, the cooling water in the reference atmospheric pressure chamber 224 may flow into the ERS 110, and a portion of the lower side of the reactor vessel 122 may be immersed in the cooling water, as illustrated in FIG. 5, so that the reactor vessel 122 may be cooled.

The injection pipe opening or closing valve 244 may be closed again after a certain flow rate of cooling water flows. Of course, the present invention is nor limited thereto, and the injection pipe opening or closing valve 244 may be opened when the pressure in the ERS 110 increases to a preset pressure or higher according to the pressure applied to the injection pipe opening or closing valve 244, and the injection pipe opening or closing valve 244 may be closed when the pressure in the ERS 110 does not reach the preset pressure. Further, the injection pipe opening or closing valve 244 may be provided to open when the temperature in the ERS 110 is higher than a preset temperature and to be closed when the temperature in the ERS 110 is lower than the preset temperature.

Further, as illustrated in FIG. 2, a circulating inlet valve 126 may be provided at an arbitrary position of the lower side of the reactor vessel 122. The cooling water flowing into the ERS 110 through the circulating inlet valve 126 may be introduced into the reactor vessel 122 to directly cool the reactor core 124. Further, a circulation discharge valve 128 may be provided above the reactor vessel 122 so that the cooling water vaporized by the heat of the reactor core 124 may be discharged to the ERS 110.

Meanwhile, the first cooling flow path 130 may further include a steam discharge valve 138 which selectively discharges the water vapor in the first cooling flow path 130 into the ERS 110 in order to increase the pressure in the ERS 110. Therefore, it is possible to artificially adjust a time point at which the pressure in the ERS 110 increases. For example, when cooling using the two-phase heat transfer mechanism is required before the pressure in the ERS 110 increases, the steam discharge valve 138 may be opened to directly increase the pressure in the ERS 110 and thus the cooling using the above-described two-phase heat transfer mechanism may be circulated.

Meanwhile, the passive infinite cooling system for a nuclear reactor according to the present embodiment may further include an outer wall cooling module 250, as illustrated in FIGS. 2 and 5. The outer wall cooling module 250 is a component which cools the outer wall of the cooling space 200 using water or air by applying a pressure of the water vapor in the ERS 110. The outer wall cooling module 250 may include a pressure inlet pipe 251, a turbine 253, a cooling fan 255, a pressure release valve 257, and a cooling fin 259.

The pressure inlet pipe 251 is a component to which the pressure of the water vapor in the ERS 110 is applied. One end of the pressure inlet pipe 251 may be located in the ERS 110, and the other end of the pressure inlet pipe 251 may be located in the ETS 220 having a pressure different from the pressure in the ERS 110. In this case, since the saturated vapor pressure cooling chamber 222 of the ERS 110 is fully filled with the cooling water, the saturated vapor pressure cooling chamber 222 of the ERS 110 may be separated from the ERS 110 in view of the pressure, and the other end of the pressure inlet pipe 251 may be located in the reference atmospheric pressure chamber 224 in which the air is present.

Further, the pressure release valve 257 may be provided in the pressure inlet pipe 251, and when a pressure higher than a preset pressure is applied to the pressure inlet pipe 251, the pressure release valve 257 may be opened so that the pressure inlet pipe 251 may be opened. Of course, when a pressure lower than the preset pressure is applied to the pressure inlet pipe 251, the pressure release valve 257 may be closed.

The turbine 253 is provided to be rotated at a pressure of a high pressure gas flowing through the pressure inlet pipe 251. Since the other end of the pressure inlet pipe 251 is located in the reference atmospheric pressure chamber 224, the turbine 253 may also be located in the reference atmospheric pressure chamber 224. Further, the gas used to rotate the turbine 253 may be condensed by being immersed into the cooling water in the reference atmospheric pressure chamber 224 and may be reduced to the cooling water. Generally, when a gas is condensed to water, a volume of the gas is significantly reduced, and thus an effect on the pressure in the reference atmospheric pressure chamber 224 may be negligible.

The cooling fan 255 may be provided on an outer upper end of the cooling space 200 and rotated by a rotational force of the turbine 253. The cooling fan 255 may be provided so as to be mechanically connected to the turbine 253 to receive the rotational force or to be rotated by power generated by the turbine 253. The cooling fan 255 may be provided to generate a forced flow flowing through the outer wall of the cooling space 200 in the water of the outer wall of the cooling space 200 and to cool the outer wall of the cooling space 200. In this case, the cooling fan 255 may be provided to generate a flow of the water flowing upward from the bottom of the cooling space 200.

Therefore, the water heated by absorbing the heat of the outer wall may be discharged upward more rapidly, and the low-temperature water present in the lower side may be introduced into the outer wall of the cooling space 200. Further, one or more cooling fins 259 may be installed on the outer wall of the cooling space 200. The above-described cooling fins 259 may be provided to be formed parallel to the flow of the water generated by the cooling fan 255 so as not to interfere with the flow of the water. As described above, since the saturated vapor pressure cooling chamber 222 in which the heat transfer occurs due to the two-phase heat transfer mechanism is disposed to be in contact with the inner side of the outer wall of the cooling space 200, the heat in the saturated vapor pressure cooling chamber 222 may be conducted through the outer wall of the cooling space 200 and the conducted heat may be cooled by the flow of the water flowing along the outer wall of the cooling space 200 and surfaces of the cooling fins 259.

Further, as described above, the inlet 236 and the outlet 238 of the second cooling flow path 230 may be formed to be opened to the outside of the cooling space 200 and to communicate with the water present outside the cooling space 200. In this case, the outlet 238 of the second cooling flow path 230 may be provided below the cooling fan 255. Therefore, due to the water flowing by the cooling fan 255, a negative pressure may be formed in the outlet 238 of the second cooling flow path 230 and thus the water in the second cooling flow path 230 may flow smoothly.

Figure 6:
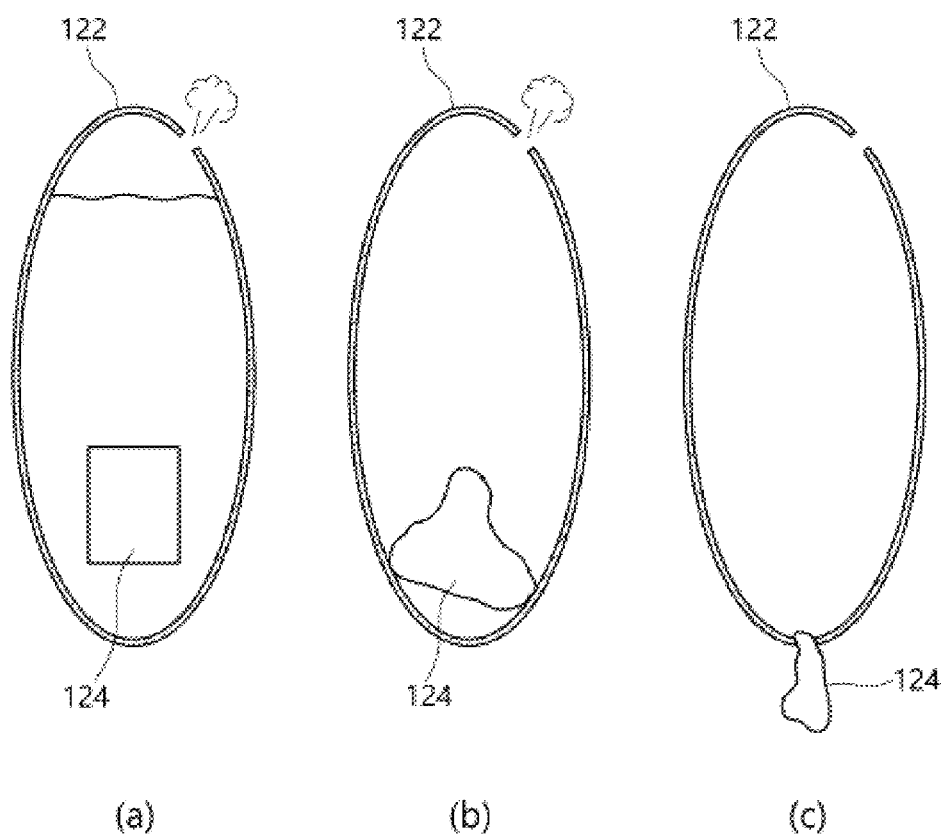
FIG. 6 illustrates views illustrating states in which a reactor vessel is overheated so that melt-through, in which melted material in the core escapes, occurs.

Meanwhile, there are various types of nuclear reactor accidents, and when the reactor vessel 122 is damaged by any types of the nuclear reactor accidents, the coolant or cooling water present inside the reactor vessel 122 is completely leaked to the outside of the reactor vessel 122, whereby decay heat of the reactor core 124 is not removed and the temperature of the reactor core 124 continuously increases to eventually melt the reactor core 124, and thus the lower portion of the reactor vessel 122 is melted due to the heat, as illustrated in FIGS. 6A and 6B. As illustrated in FIG. 6C, melt through in which the melted material of the reactor core 124 is leaked to the lower portion of the reactor vessel 122 may occur, which is treated as a very dangerous and critical serious accident among the nuclear reactor accidents.

Figure 7:
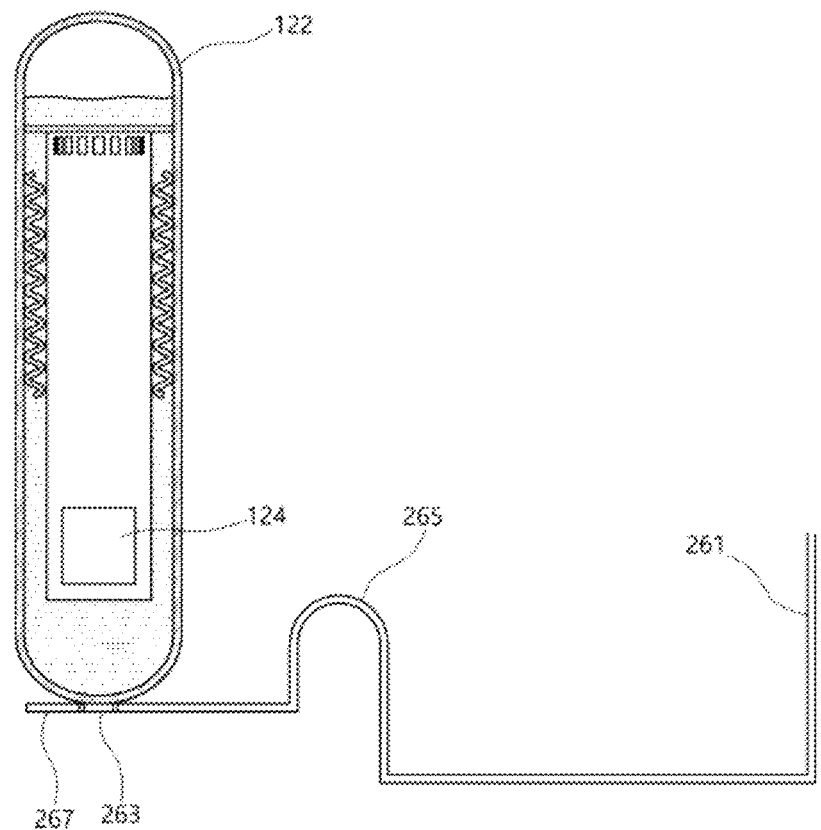
FIG. 7 is a view illustrating a state in which a cooling water supply pipe is provided below a reactor vessel.
Figure 8:
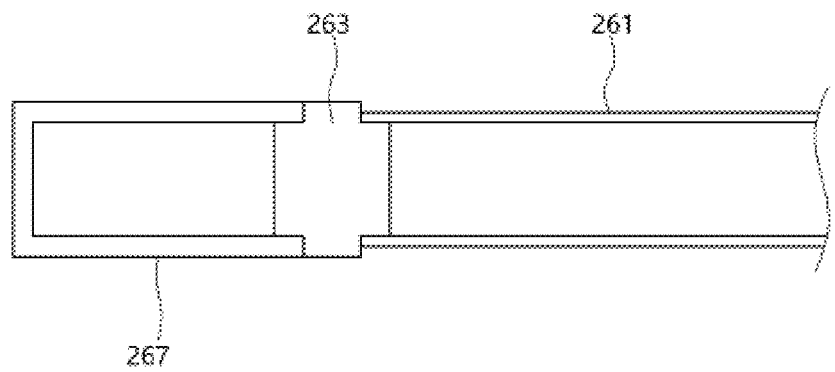
FIG. 8 is a cross-sectional view illustrating a cooling water supply pipe and a low-temperature molten alloy body of FIG. 7.

In order to prevent such a melt through, various safety systems and devices are installed. However, when an appropriate action is not taken due to any reason that some of these devices fail and do not work, the operator is absent, or the operator makes a mistake, there is a risk that serious accidents may occur. In order to prevent the above risk, as illustrated in FIGS. 7 and 8, in an emergency in which the temperature in the reactor vessel 122 increases rapidly due to the melting of the reactor core 124 such that there is a concern about melting and damage of the reactor vessel 122, a cooling water supply pipe 261 and a low-temperature molten alloy body 263 may be provided so that the reactor vessel 122 is cooled by directly reacting to the increase of the temperature in the reactor vessel 122 and the melt through may be prevented.

The cooling water supply pipe 261 may guide the cooling water in the EAS 210 to the lower side of the reactor vessel 122 of the ERS 110. To this end, the cooling water supply pipe 261 may be provided to cross the first space 100 and the cooling space 200. One end of the cooling water supply pipe 261 may be located in the ERS 110, and the other end of the cooling water supply pipe 261 may be located in the EAS 210. In this case, the other end of the cooling water supply pipe 261 located in the EAS 210 may be formed at a higher level than one end of the ERS 110 and provided such that the cooling water flows by gravity.

The low-temperature molten alloy body 263 may be a component, which is provided on an end of the ERS 110 side of the cooling water supply pipe 261, that ordinarily blocks the cooling water supply pipe 261 to block the flow of the cooling water and opens the cooling water supply pipe 261 by being melted by the heat transferred from the reactor vessel 122 when the reactor vessel 122 is overheated. In this case, the cooling water supply pipe 261, in which the low-temperature molten alloy body 263 is provided, may be installed to be in contact with the reactor vessel 122 or to be very close to the reactor vessel 122. This is to better receive the heat in the reactor vessel 122.

Further, in the cooling water supply pipe 261, a high-temperature fluid backflow-prevention pipe 265 which blocks the high-temperature cooling water in the cooling water supply pipe 261 heated by the reactor vessel 122 from flowing back into the EAS 210 may be formed. The high-temperature fluid backflow-prevention pipe 265 may be formed in an inverted U shape curved upward from a point spaced apart from the end of the cooling water supply pipe 261 in which the low-temperature molten alloy body 263 is provided. That is, an upper end of the high-temperature fluid backflow-prevention pipe 265 is formed at a position higher than the end of the EAS 210 side of the cooling water supply pipe 261.

Since the end side of the cooling water supply pipe 26 is in contact with the reactor vessel 122, the heat in the reactor vessel 122 may be conducted, whereby the cooling water present inside the end side of the cooling water supply pipe 261 may be heated by the heat in the reactor vessel 122. When the high-temperature cooling water is introduced into the EAS 210, the high-temperature cooling water may adversely affect the overall cooling performance, and thus the high-temperature fluid backflow-prevention pipe 265 is provided to block the cooling water heated at a high temperature from being introduced into the EAS 210. Further, a weighted body 267 may be provided in an end portion of the low-temperature molten alloy body 263. This is to cause the low-temperature molten alloy body 263 to be separated from the cooling water supply pipe 261 by a weight of the weighted body 267 when the low-temperature molten alloy body 263 is melted.

When the coolant of the reactor vessel 122 is completely leaked, the temperature of the outer wall of the reactor vessel 122 rapidly increases due to accumulation of the decay heat of the reactor core 124 and continuously increases beyond a maximum temperature of safety management, for example, 350° C. Generally, the reactor vessel 122 starts to melt at about 1500° C. In consideration of the maximum temperature of safety management and the melting temperature in the reactor vessel 122, when the cooling water is supplied in a range of about 350° C. to 600° C., the melting caused by the overheating of the reactor vessel 122 may be reliably prevented.

Therefore, the low-temperature molten alloy body 263 may be made of a low-temperature molten alloy having a melting point in a range of 350° C. to 600° C. In view of improving safety, the melting point of the alloy is more preferably about 400° C. However, the temperature range as described above is a value arbitrarily set in consideration of safety and may be any value as long as the value exceeds the normal temperature range of the reactor vessel 122 in a normal nuclear reactor operating state.

The low-temperature molten alloy having the melting point in the temperature range described above may be made by appropriately combining metals having a low melting point, such as aluminum (Al), magnesium (Mg), antimony (Sb), zinc (Zn), lead (Pb), cadmium (Cd), bismuth (Bi), tin (Sn), and the like. Further, the weighted body 267 (70) preferably has a heavy weight without being affected by the increase in the temperature in the reactor vessel 122 (20), and for example, may be made of a steel material. Of course, the present invention is not limited thereto, and the weighted body 267 may be made of a stone or ceramic material.

Figure 9:
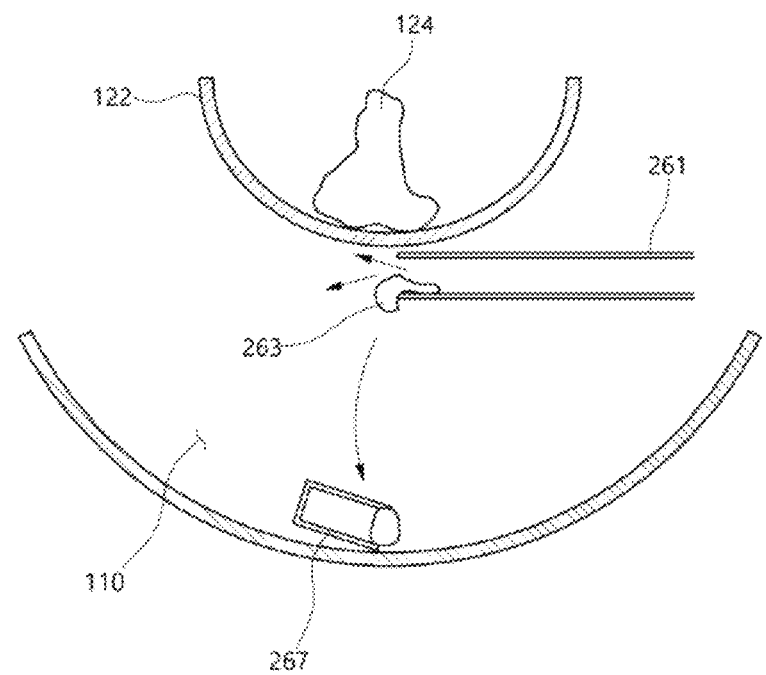
FIG. 9 is a view illustrating a state in which a low-temperature molten alloy body melted by heat in a reactor vessel is detached from a cooling water supply pipe so that the cooling water supply pipe is opened.
Figure 10:
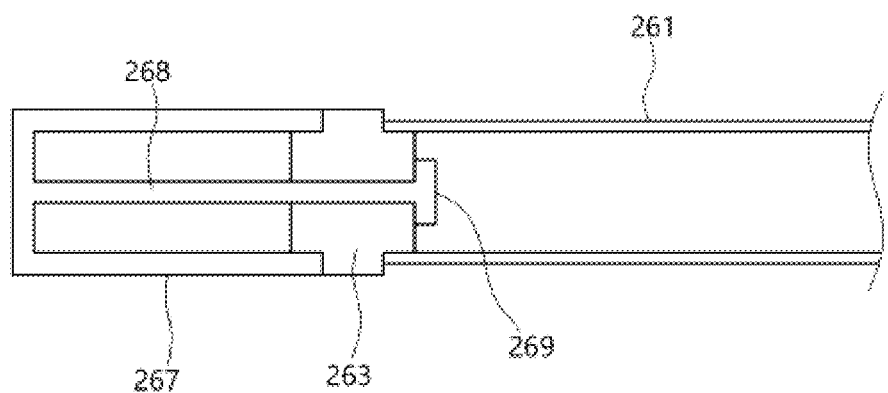
FIG. 10 is a view illustrating another form of a weighted body of FIG. 8.

Therefore, as illustrated in FIG. 9, when the reactor vessel 122 is overheated, the low-temperature molten alloy body 263 may be melted due to the overheating and the melted low-temperature molten alloy body 263 may fall due to its own weight together with the weighted body 267. Since the low-temperature molten alloy body 263 that shields the cooling water supply pipe 261 is removed, the cooling water supply pipe 261 may be opened so that the cooling water in the EAS 210 may be introduced into the lower portion of the reactor vessel 122 of the ERS 110, a portion of the lower portion of the reactor vessel 122 may be immersed in the introduced cooling water so that cooling is performed, and thus the melting of the reactor vessel 122 may be prevented.

Figure 11:
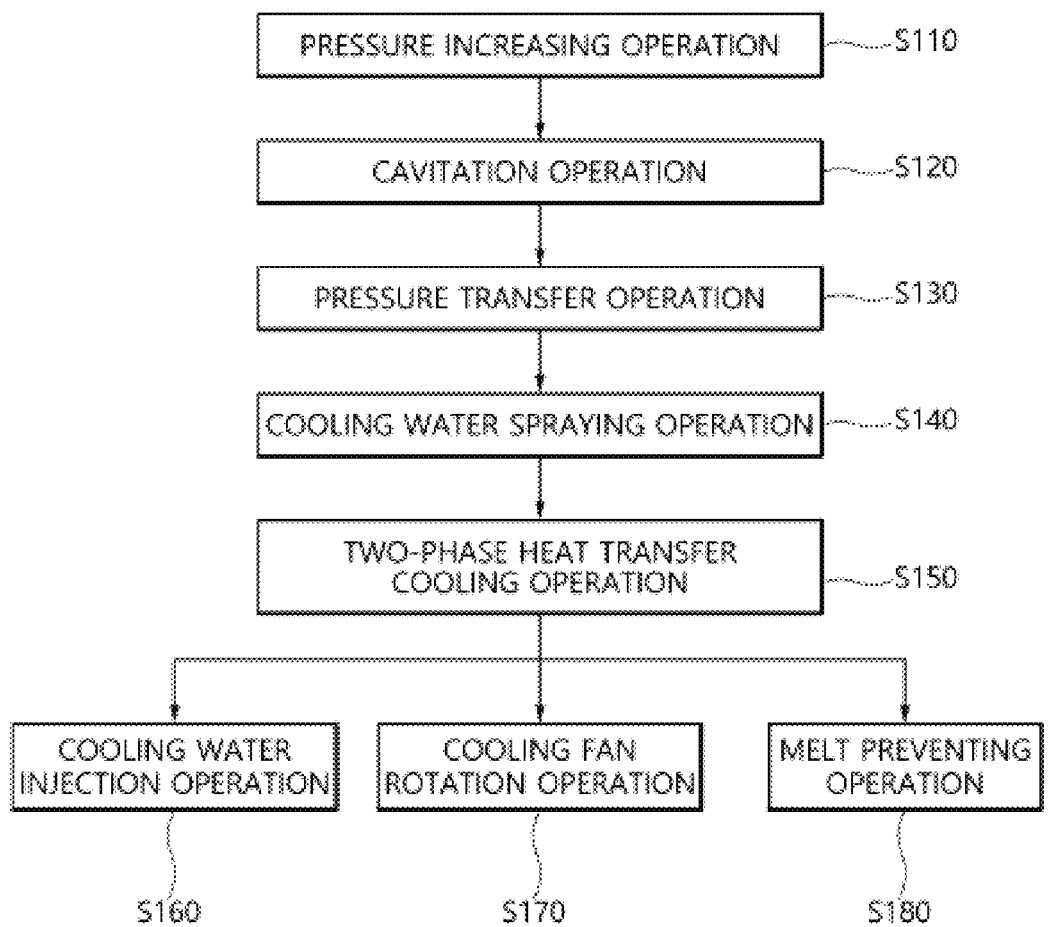
FIG. 11 is a flowchart illustrating a method of operating a passive infinite cooling system for a nuclear reactor according to an embodiment of the present invention.

Alternatively, in order to more reliably remove the low-temperature molten alloy body 263 when the low-temperature molten alloy body 263 is melted, as illustrated in FIG. 11, a connecting rod 268 may be formed to protrude from an inner side wall of the weighted body 267 and an engaging plate 269 having an expanded diameter may be formed in an end portion of the connecting rod 268. The connecting rod 268 passes through the low-temperature molten alloy body 263, and the engaging plate 269 is formed to cross a side surface inside an outlet of the low-temperature molten alloy body 263. When the structure as described above is applied, the low-temperature molten alloy body 263 is melted so that the engaging plate 269 may remove a larger amount of the melted material of the low-temperature molten alloy body 263 from the cooling water supply pipe 261 when the weighted body 267 falls due to its own weight, and thus the open state may be improved and a larger amount of low-temperature water may be supplied more rapidly.

Hereinafter, an embodiment of a method of operating the passive infinite cooling system for a nuclear reactor described above will be described with reference to FIG. 11. The passive infinite cooling system for a nuclear reactor according to the present embodiment may include a pressure increasing operation S110, a cavitation operation S120, a pressure transfer operation S130, a cooling water spraying operation S140, and a two-phase heat transfer cooling operation S150, as illustrated in FIG. 11.

First, when the nuclear reactor is being normally operated, all heat generated in a reactor core 124 is used to generate power through a nuclear reactor drive system 120. In this case, a nuclear reactor safety system, such as an EAS 210 or an ETS 220, is not operated, and all of the EAS 210 and a saturated vapor pressure cooling chamber 222 may maintain a state of being filled with cooling water, as illustrated in FIG. 2. Meanwhile, when the nuclear reactor is abnormally overheated due to various reasons during operation of the nuclear reactor, the nuclear reactor safety system may be operated. When the nuclear reactor safety system is operated, the nuclear reactor drive system 120 may be stopped, and all the heat generated in the reactor core 124 may be discharged through a first cooling flow path 130.

When the nuclear reactor is abnormally overheated, the process may enter the pressure increasing operation S110. The pressure increasing operation S110 is an operation in which a temperature in the ERS 110 increases so that a pressure in the first space 100 increases. The ERS 110 is fully filled with a gas such as air. When the reactor core 124 is overheated, the heat may be transferred to the gas in the ERS 110 through a reactor vessel 122, and a pressure of the gas in the heated ERS 110 may increase due to the well-known Boyle and Charles' Laws. Meanwhile, as described above, the heat generated in the reactor core 124 may be discharged through the first cooling flow path 130, thereby entering the cavitation operation S120.

In the cavitation operation S120, the heat in the reactor vessel 122 may be transferred to the saturated vapor pressure cooling chamber 222 through a second heat exchanger 134 of the first cooling flow path 130, as illustrated in FIG. 3, and cooling water in the saturated vapor pressure cooling chamber 222 heated by the second heat exchanger 134 may be vaporized so that a cavity may be generated. Accordingly, a portion or all of the second heat exchanger 134 of the first cooling flow path 130 and a third heat exchanger 232 of a second cooling flow path 230 may be exposed above a water surface. Meanwhile, the process may enter the pressure transfer operation S130 in which the pressure in the ERS 110 increased in the pressure increasing operation S110 is transferred to the EAS 210.

In the pressure transfer operation S130, the pressure in the ERS 110 may be transferred to the EAS 210 through a pressure balance pipe 214. The pressure which is transferred to the EAS 210 through the pressure balance pipe 214 may press the cooling water in the EAS 210 at an upper side downward, and thus the process may enter the cooling water spraying operation S140. In the cooling water spraying operation S140, the cooling water pressurized by the pressure balance pipe 214 may be raised to the saturated vapor pressure cooling chamber 222 through a coolant spray pipe 228 by the pressure of the cooling water and sprayed onto the second heat exchanger 134. Meanwhile, when the cooling water is sprayed onto the second heat exchanger 134, the two-phase heat transfer cooling operation S150 may be performed.

In the two-phase heat transfer cooling operation S150, as illustrated in FIG. 4, the cooling water sprayed from the coolant spray pipe may be vaporized while absorbing heat of the second heat exchanger 134 on a surface of the second heat exchanger 134, and the cooling may be performed using a two-phase heat transfer mechanism in which water vapor around the third heat exchanger 232 is cooled and condensed by the third heat exchanger 232 and returns to the form of water. The heat absorbed by the third heat exchanger 232 may be discharged to the outside of the cooling space 200 through the second cooling flow path. Further, since the saturated vapor pressure cooling chamber 222 is connected to an outer wall of the cooling space 200, heat dissipation may be performed by heat transfer through the outer wall of the cooling space 200.

When the nuclear reactor is further overheated and the cooling is not satisfactorily achieved through the above-described procedure, the process may enter a cooling water injection operation S160. When the heat discharged from the second heat exchanger 134 is increased, a cavity of an upper side of the saturated vapor pressure cooling chamber 222 may be increased, and the amount of cooling water introduced into the reference atmospheric pressure chamber 224 may be increased by as much as the cavity.

Further, when the cooling water sprayed from the coolant spray pipe onto the saturated vapor pressure cooling chamber 222 accumulates, the amount of cooling water introduced into the reference atmospheric pressure chamber 224 from the saturated vapor pressure cooling chamber 222 may be increased. Therefore, a water level in the reference atmospheric pressure chamber 224 may be increased. In such a situation, as illustrated in FIG. 5, when the nuclear reactor is further overheated, the injection pipe opening or closing valve 244 may be opened and the process may enter the cooling water injection operation S160.

As described above, the injection pipe opening or closing valve 244 may be opened when the pressure in the ERS 110 increases to a preset pressure or higher according to the pressure applied to the injection pipe opening or closing valve 244, and the injection pipe opening or closing valve 244 may be closed when the pressure in the ERS 110 does not reach the preset pressure. Further, the injection pipe opening or closing valve 244 may be provided to be opened when the temperature in the ERS 110 is higher than a preset temperature and to be closed when the temperature in the ERS 110 is lower than the preset temperature.

In the cooling water injection operation S160, the cooling water in the reference atmospheric pressure chamber 224 may be injected into the ERS 110 so that the reactor vessel 122 may be directly cooled by the cooling water. The cooling water heated by the reactor vessel 122 may be vaporized to increase the pressure in the ERS 110 and the increased pressure may be transferred to a pressure increasing pipe, and thus the above-described pressure transfer operation S130, cooling water spraying operation S140, and two-phase heat transfer cooling operation S150 may be performed repeatedly. Further, when the cooling water level in the reactor vessel 122 is lowered, the cooling water flowing into the ERS 110 through the circulating inlet valve 126 may be introduced into the reactor vessel 122 to directly cool the reactor core 124.

Further, a circulation discharge valve 128 may be provided above the reactor vessel 122 so that the cooling water vaporized by the heat of the reactor core 124 may be discharged to the ERS 110. Further, when the pressure in the EAS 210 increases to a preset pressure, a cooling fan rotation operation S170 may be performed. When the pressure in the EAS 210 increases to the preset pressure or higher, a pressure release valve 257 is operated and the process may enter the cooling fan rotation operation S170.

The pressure release valve 257 may be opened, the high-level pressure in the EAS 210 may be applied to the pressure inlet pipe 251, a turbine 253 may be rotated by the pressure, and a cooling fan 255 may be rotated by a rotational force of the turbine 253. The cooling fan 255 is rotated, and thus a flow is generated in the water around the cooling space 200, and the heat transferred to the outer wall of the cooling space 200 may be more smoothly absorbed to cool the cooling space 200.

Meanwhile, when the reactor vessel 122 is abnormally overheated, the reactor vessel 122 may enter a melt preventing operation S180. When the reactor vessel 122 is abnormally overheated, a low-temperature molten alloy body 263 provided in a cooling water supply pipe 261 is melted so that the cooling water supply pipe 261 is opened. Therefore, the cooling water in the EAS 210 may be introduced into the lower side of the reactor vessel 122 so that a portion of the reactor vessel 122 may be immersed into the cooling water, and the reactor vessel 122 may be directly cooled by the cooling water and thus melt through may be prevented.

Meanwhile, when the nuclear reactor safety system is to be urgently operated before the pressure in the ERS 110 increases, a steam release operation, in which the pressure in the ERS 110 is directly increased, may be performed by opening the steam discharge valve 138. When the steam discharge valve 138 is opened in the steam release operation, the above-described pressure increasing operation S110, cavitation operation S120, pressure transfer operation S130, cooling water spraying operation S140, and two-phase heat transfer cooling operation S150 may be performed sequentially or simultaneously. Therefore, the passive infinite cooling system for a nuclear reactor described above may be operated without separate control of the operator, the nuclear reactor safety system may be operated by the heat generated in the nuclear reactor and by the pressure increased due to the heat without a separate power supply, and an infinite circulation operation may be performed until the pressure in the nuclear reactor is lowered without additional cooling water supplement, and thus the safety of the nuclear reactor may be further improved.

According to the passive infinite cooling system for a nuclear reactor and the method of operating the same, the following effects are obtained. First, since circulation of cooling water may occur naturally due to heat generated in a nuclear reactor and a pressure, no separate operation of an operator can be required and supply of external power can be minimized. Therefore, even when the absence of the operator occurs due to operator evacuation or injury or even when power supplied to a cooling system is blocked, the cooling system can operate on its own, thereby improving safety.

Second, by using a two-phase heat transfer mechanism instead of a pool boiling method, a heat transfer rate can be significantly improved, thereby improving safety. Third, by installing a saturated vapor pressure cooling chamber of an ETS, in which a two-phase heat transfer mechanism is performed, adjacent to an outer wall of a cooling space, heat in the saturated vapor pressure cooling chamber can be conducted to the outside of the cooling space through the outer wall of the cooling space, thereby improving cooling efficiency. Fourth, not only ETS but also the cooling water in the EAS can be cooled by a second cooling flow path which cools cooling water, and thus heat can be more smoothly dissipated.

Fifth, by providing an outer wall cooling module which cools the outer wall of the cooling space using the pressure in the ERS, heat conduction by the outer wall of the cooling space can be more activated and thus cooling can be more efficiently performed. Sixth, when the reactor vessel is abnormally overheated, a cooling water supply pipe and a low-temperature molten alloy body can be provided to cool the reactor vessel, and thus melt through, in which the reactor vessel is melted and melted material of the core escapes the reactor vessel, can be prevented.

Effects of the present invention are not limited to the above-described effects and other unmentioned effects may be clearly understood by those skilled in the art from the description of the claims. The exemplary embodiments according to the present invention have been described, and the fact that the present invention can be embodied in other specific forms without departing from the spirit or scope of the embodiments described above should be apparent to those skilled in the art. Therefore, the above-described embodiments are to be regarded as illustrative rather than restrictive, and accordingly, the present invention is not limited to the above description and may be changed within the scope of the appended claims and equivalents thereof.

What is claimed is:

1. A passive cooling system for a nuclear reactor, the passive cooling system comprising:
   a first space including an energy release space, the energy release space having a reactor vessel therein, the reactor vessel configured to accommodate a reactor core; and
   a cooling space including an energy absorbing space, an energy transfer space, and a coolant spray pipe,
   wherein the first space and the cooling space are separated from each other by a first separation wall and the cooling space is defined by the first separation wall and an outer wall, the energy absorbing space configured to accommodate cooling water, the energy absorbing space being separated from the energy release space, the energy absorbing space configured to communicate with the energy release space through a pressure balance pipe such that a pressure in the energy release space is transferred to the energy absorbing space,
   wherein the energy transfer space is disposed above the energy absorbing space and isolated from the energy release space and the energy absorbing space, the energy transfer space configured to absorb and cool heat transferred from the reactor vessel through a cooling flow conduit and discharge the absorbed heat through the outer wall defining the cooling space, and the coolant spray pipe configured to transfer the cooling water accommodated in the energy absorbing space and pressurized by the pressure balance pipe to the energy transfer space, wherein the cooling flow conduit includes a plurality of heat exchangers, the heat exchangers including, a first heat exchanger configured to absorb the heat in the reactor vessel, and a second heat exchanger in a saturated vapor pressure cooling chamber and configured to discharge the heat absorbed by the first heat exchanger, wherein the energy transfer space includes the saturated vapor pressure cooling chamber and a reference atmospheric pressure chamber, wherein the saturated vapor pressure cooling chamber is in physical contact with an upper portion of the first separation wall, and configured to accommodate cooling water therein, wherein the second heat exchanger of the cooling flow conduit and a spray-side end of the coolant spray pipe are located in the saturated vapor pressure cooling member, wherein the reference atmospheric pressure chamber is disposed under the saturated vapor pressure cooling chamber, separated from the saturated vapor pressure cooling chamber by a second separation wall, and configured to communicate with the saturated vapor pressure cooling chamber at a lower side of the saturated vapor pressure cooling chamber, the reference atmospheric pressure chamber configured to be at least partially filled with air so as to achieve a pressure balance with the cooling water in the saturated vapor pressure cooling chamber, and receive cooling water from the saturated vapor pressure cooling chamber, wherein the passive cooling system is configured to change a level of the cooling water in the reference atmospheric pressure chamber according to a pressure in the saturated vapor pressure cooling chamber, wherein the passive cooling system is configured to spray cooling water in the energy absorbing space onto the second heat exchanger through the spray-side end of the coolant spray pipe, wherein the reference atmospheric pressure chamber is surrounded by the saturated vapor pressure cooling chamber, the energy absorbing space, and the energy release space so as not to be adjacent to the outer wall defining the cooling space, wherein the reference atmospheric pressure chamber has a closed top structure which separates the reference atmospheric pressure chamber from the saturated vapor pressure cooling chamber, and wherein the pressure balance pipe has an inverted U shape and is provided such that a top of the inverted U shape is at a higher level than a top of the energy absorbing space.

2. The passive cooling system of claim 1, wherein the cooling flow conduit further includes a steam discharge valve configured to selectively discharge water vapor in the cooling flow conduit into the energy release space in order to increase the pressure in the energy release space.

3. The passive cooling system of claim 1, wherein the energy transfer space is configured to allow the saturated vapor pressure cooling chamber to communicate with the reference atmospheric pressure chamber at a bottom or a lower side of the second separation wall.

4. The passive cooling system of claim 1, further comprising:

an additional cooling flow conduit in the energy transfer space and configured to discharge heat in the energy transfer space to an outside of the cooling space, wherein the passive cooling system is configured to vaporize the cooling water sprayed from the coolant spray pipe toward the second heat exchanger while absorbing heat of the second heat exchanger, and transfer the heat by a two-phase heat transfer mechanism in which the vaporized cooling water is cooled and condensed in the additional cooling flow conduit.

5. The passive cooling system of claim 4, wherein the additional cooling flow conduit includes a third heat exchanger in the saturated vapor pressure cooling chamber and configured to absorb heat in the saturated vapor pressure cooling chamber heated by the cooling flow conduit.

6. The passive cooling system of claim 5, wherein the additional cooling flow conduit further includes a fourth heat exchanger in the energy absorbing space and configured to absorb heat in the energy absorbing space.

7. The passive cooling system of claim 6, wherein, in the additional cooling flow conduit, the fourth heat exchanger is at a lower level than the third heat exchanger.

8. The passive cooling system of claim 1, further comprising:

a coolant injection pipe configured to introduce the cooling water in the reference atmospheric pressure chamber into the energy release space; and an injection pipe opening or closing valve configured to open the coolant injection pipe.

9. The passive cooling system of claim 1, wherein the cooling space is adjacent to sea water or river water.

10. The passive cooling system of claim 1, further comprising:

an outer wall cooling module configured to cause water or air to cool an upper portion of the outer wall defining the cooling space under a pressure of water vapor in the energy release space.

11. The passive cooling system of claim 10, wherein the outer wall cooling module includes:

a pressure inlet pipe into which the water vapor in the energy release vessel space is introduced;

a turbine configured to generate power under the pressure of the water vapor discharged from the pressure inlet pipe;

a cooling fan above the cooling space and configured to rotate to cause the water or the air on the outer wall defining the cooling space to flow upward by a rotational force of the turbine; and a pressure release valve configured to selectively open the pressure inlet pipe.

12. The passive cooling system of claim 11, further comprising:

a cooling fin on the outer wall defining the cooling space.

13. The passive cooling system of claim 1, further comprising:

a cooling water supply pipe configured to guide the cooling water in the energy absorbing space to a lower side of the reactor vessel of the energy release space; and a molten alloy body on an end side of the cooling water supply pipe and configured to shield the cooling water supply pipe and open the cooling water supply pipe, when the reactor vessel is overheated, by being melted by the heat transferred from the reactor vessel.

14. The passive cooling system of claim 13, wherein
the cooling water supply pipe includes a fluid backflow-prevention pipe, and
the fluid backflow-prevention pipe has an inverted U shape curved upward from a point spaced apart from the end side of the cooling water supply pipe in which the molten alloy body is provided.

15. The passive cooling system of claim 13, further comprising:
a weighted body on an outer end portion of the molten alloy body, the weighted body having a specific weight to separate the molten alloy body from the cooling water supply pipe.

\* \* \* \* \*